(12) United States Patent
Mitsis-Koutoukis

(10) Patent No.: US 10,173,122 B2
(45) Date of Patent: Jan. 8, 2019

(54) STORABLE EXERCISER DEVICE

(71) Applicant: Alexandros Mitsis-Koutoukis, Attica (GR)

(72) Inventor: Alexandros Mitsis-Koutoukis, Attica (GR)

( * ) Notice: Subject to any disclaimer, the term of this patent is extended or adjusted under 35 U.S.C. 154(b) by 0 days.

(21) Appl. No.: 15/601,104

(22) Filed: May 22, 2017

(65) Prior Publication Data

US 2018/0333632 A1   Nov. 22, 2018

(51) Int. Cl.
*A63B 21/00* (2006.01)
*A63B 71/00* (2006.01)
*A63B 21/04* (2006.01)
*A63B 1/00* (2006.01)
*A63B 21/055* (2006.01)
*A63B 23/12* (2006.01)

(52) U.S. Cl.
CPC ............ *A63B 71/0036* (2013.01); *A63B 1/00* (2013.01); *A63B 21/0442* (2013.01); *A63B 21/0557* (2013.01); *A63B 23/1227* (2013.01); *A63B 2225/093* (2013.01)

(58) Field of Classification Search
CPC ... A63B 71/0036; A63B 23/1227; A63B 1/00; A63B 21/0442; A63B 21/0557; A63B 2225/093

USPC .......................................................... 482/38
See application file for complete search history.

(56) References Cited

U.S. PATENT DOCUMENTS

| | | | |
|---|---|---|---|
| 9,895,564 B1* | 2/2018 | Katz ........................ | A63B 1/00 |
| 2005/0130814 A1* | 6/2005 | Nitta ........................ | A63B 1/00 |
| | | | 482/121 |
| 2006/0276310 A1* | 12/2006 | Martin ............. | A63B 21/00065 |
| | | | 482/92 |
| 2008/0119333 A1* | 5/2008 | Bowser ................ | A63B 21/055 |
| | | | 482/62 |
| 2009/0069161 A1* | 3/2009 | Caldwell .......... | A63B 21/00047 |
| | | | 482/138 |
| 2010/0151995 A1* | 6/2010 | Forman ............ | A63B 21/00047 |
| | | | 482/8 |
| 2011/0053738 A1* | 3/2011 | Osbourne .......... | A63B 21/0552 |
| | | | 482/122 |
| 2012/0329619 A1* | 12/2012 | Goldberg ............... | A63B 21/04 |
| | | | 482/129 |

* cited by examiner

Primary Examiner — Andrew S Lo

(57) ABSTRACT

An exerciser device comprising a telescopically deployed vertically oriented tower, a telescopically deployed horizontally oriented corridor and a housing provided at a bottom end of the telescopically deployed vertically oriented tower, wherein the housing is adapted to provide a neatly configured storage medium of the exerciser device, while further providing a support base for the deployment of the vertically oriented tower and a means for a controlled deployment of the horizontally oriented corridor.

9 Claims, 14 Drawing Sheets

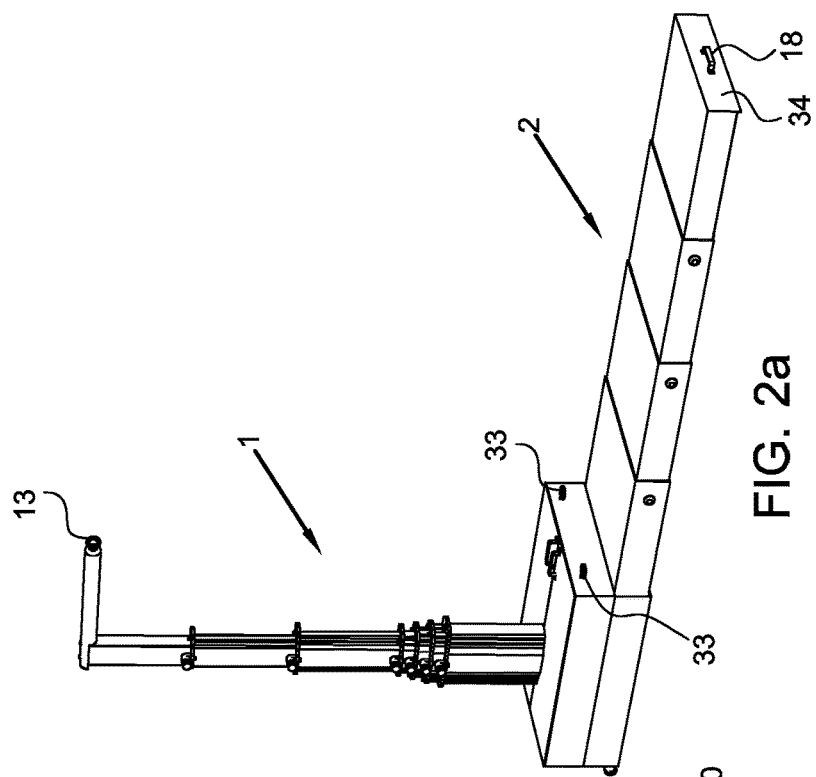
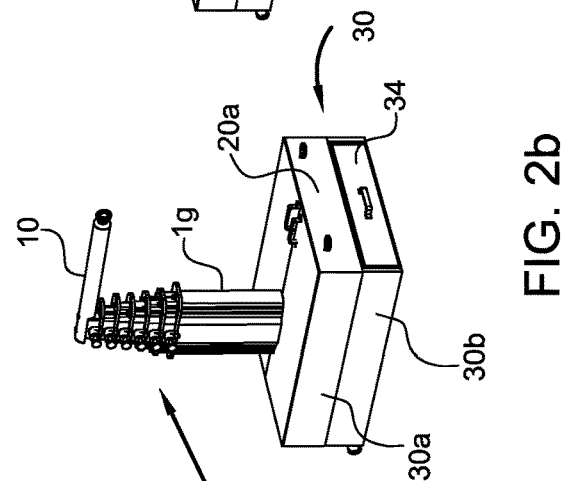
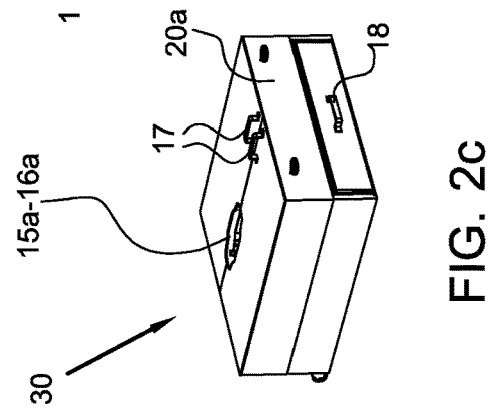
FIG. 2a
FIG. 2b
FIG. 2c

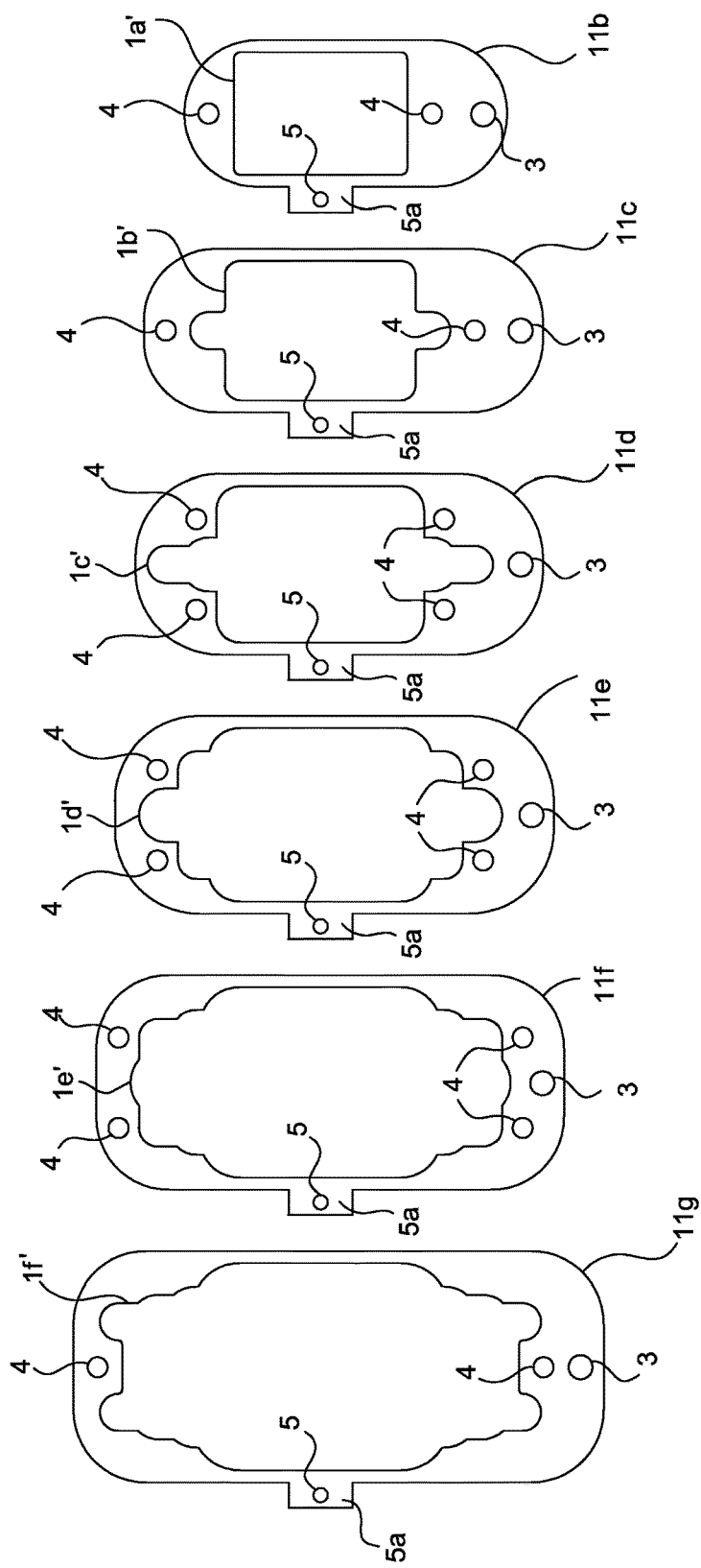
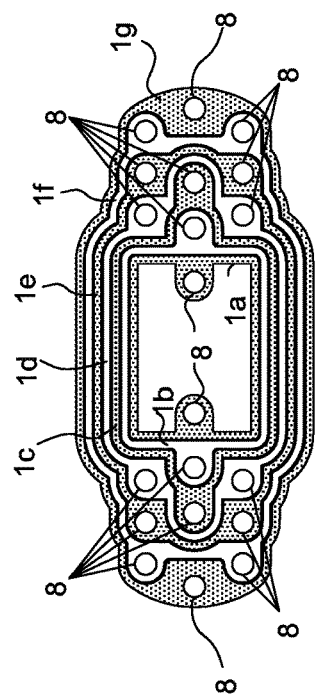
FIG. 7
FIG. 8

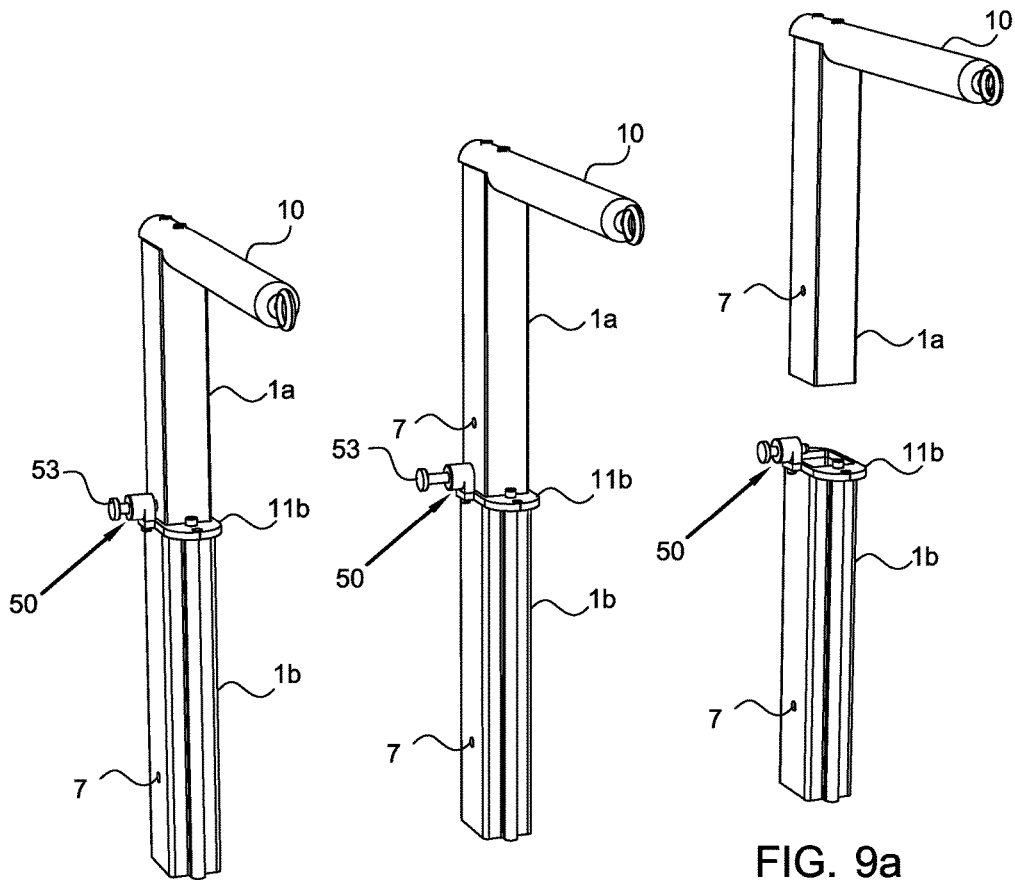
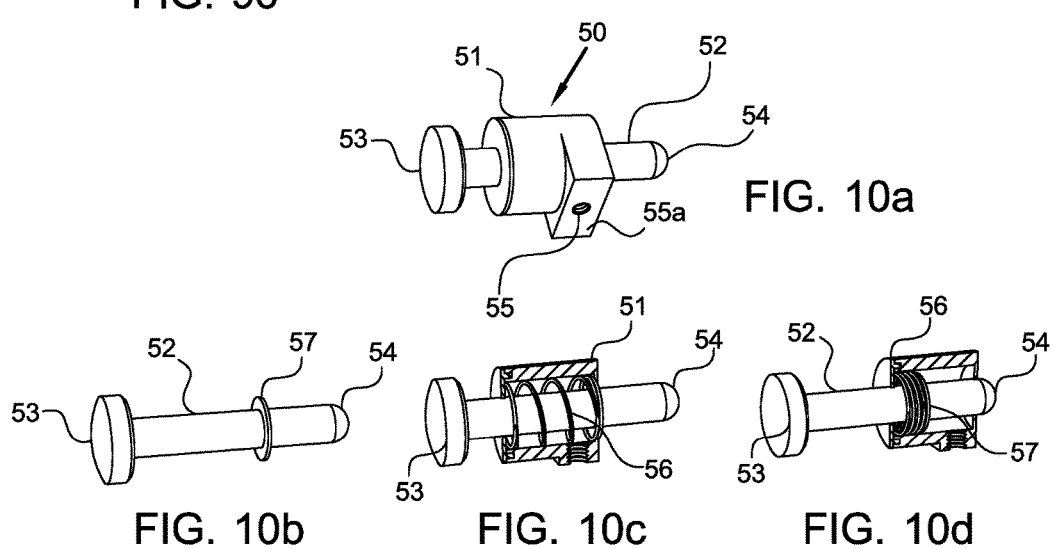
FIG. 9c  FIG. 9b  FIG. 9a
FIG. 10a
FIG. 10b  FIG. 10c  FIG. 10d

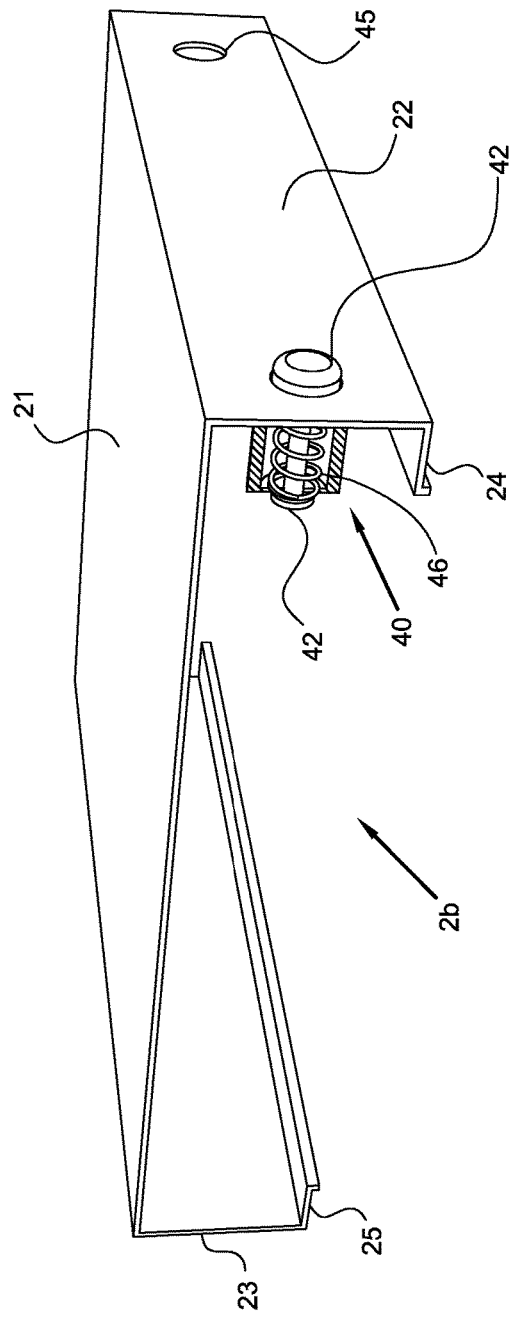
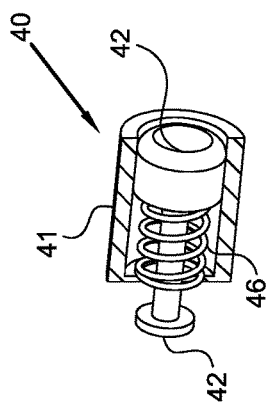
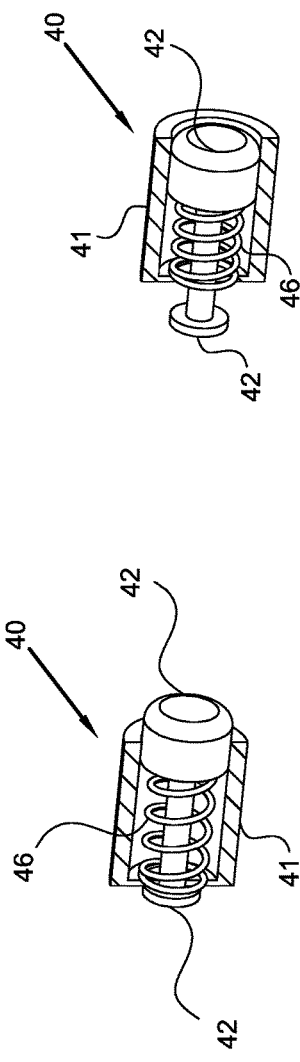
FIG. 12
FIG. 12a
FIG. 12b

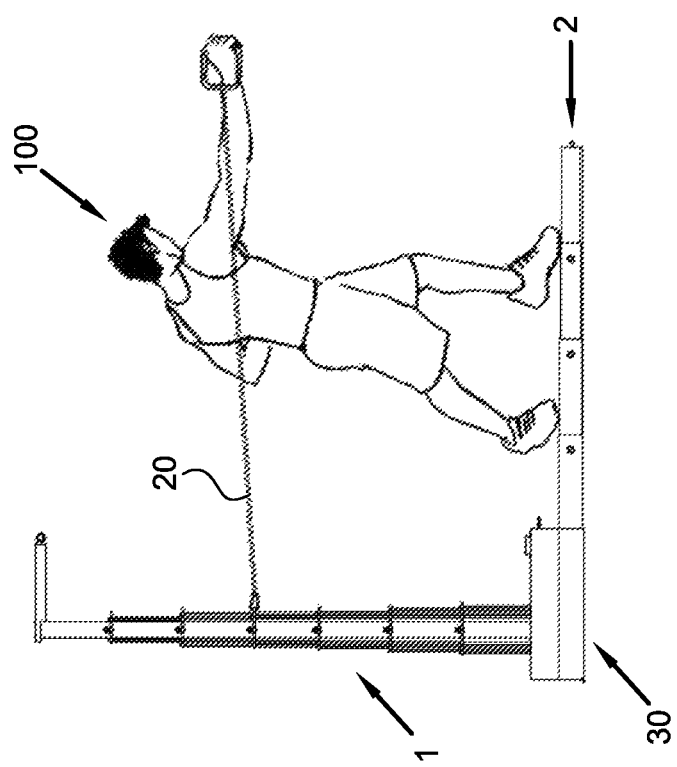
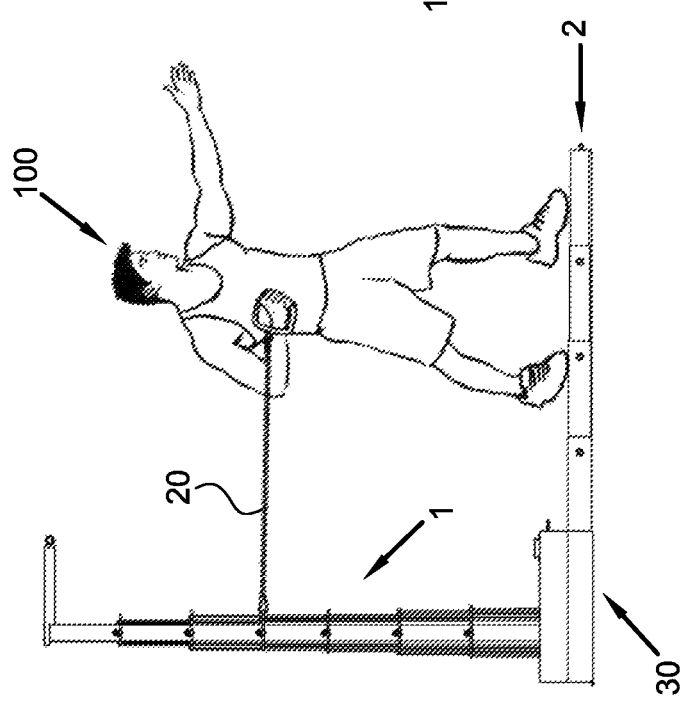

STORABLE EXERCISER DEVICE

THE FIELD OF THE ART

The invention relates to an exerciser device and more particularly to a storable exerciser device using resistance straps for performing various exercises.

BACKGROUND ART

Exerciser devices that use resistance straps for performing various suspension exercises are known in the art. Amongst such exerciser devices a widespread use is currently reported of the so called TRX exerciser device that is an acronym indicating a Total-body Resistance Exerciser or else a Total Resistance Exercise device. TRX is a handy way to perform a lot of different body weight movements since TRX enables a user to get different amounts of resistance by changing own leverage, whilst at the same time it encourages a plurality of supporting muscles to be activated through the inherent instability of the apparatus.

A TRX exerciser device comprises resistance straps and at least one tower comprising a plurality of points of suspension of the resistance straps, wherein a user may detachably connect one end of such resistance straps in selected points of suspension along the aforementioned tower in order to perform desired exercises. The aforementioned tower has to be fixedly mounted onto the surface of a wall in a domestic environment and such mounting is performed through drilling an array of holes onto the surface of the wall and use of bolts being driven through these holes to support the tower. The appearance of the tower onto the wall is generally aesthetically undesirable, whilst the fixedly mounting of the tower onto the wall makes dismantling of the same rather awkward and therefore storage and/or transporting the exerciser apparatus from one place to another is not an easy task. It is herein noted that a pair of towers is required in practice in order for the device appropriately providing a full set of exercises for an overall body training session and this aggravates even further the overall aesthetic discomfort and difficulty of dismantling for storage and/or transport.

It is therefore the object of the present invention to provide a handily storable and transportable exerciser device employing resistance straps, which are selectively attached at varying points along a telescopically deployed tower to perform varying body training exercises, such tower being stored when dismantled within a housing of the device that is at the same time adapted to provide support of the tower when deployed for use.

It is a further object of the invention to provide the aforementioned telescopically deployable tower with a structure that enhances the rigidity thereof and enables an efficiently robust performance thereof during use in conducting a variety of exercises necessitating a pulling action being exerted at varying points along the tower by the resistance straps mounted thereupon.

It is a further object of the invention to provide a telescopically deployed horizontally oriented corridor that constitutes a foot rest for a user exercising a pulling action on a resistance strap mounted onto the vertically oriented tower, whereby this corridor with the user standing thereupon counteracts a moment of inertia acting onto the tower as a result of the exercising of a pulling action on a resistance strap and wherein the corridor is adapted to being stored within the housing of the device.

SUMMARY OF THE INVENTION

In accordance with a preferred embodiment the invention discloses a storable exerciser device comprising:

a telescopically deployed vertically oriented tower comprising a plurality of sequentially connected pillars including a bottom pillar, a top pillar and intermediate pillars therebetween, wherein these sequentially connected pillars have sequentially diminishing sections from the bottom pillar to the top pillar, the bottom pillar and each one of the intermediate pillars being provided with a flange fixedly mounted on a top end thereof and being adapted to being inserted within an immediately adjacent underlying pillar and to receive an immediately adjacent overlying pillar, wherein the flange that is fixedly mounted on a top end of the bottom pillar and each one of the intermediate pillars is provided with at least one point of suspension of a resistance strap;

a telescopically deployed horizontally oriented corridor comprising a plurality of sequentially assembled profile members including an innermost profile member, an outermost profile member and intermediate profile members therebetween, the horizontally oriented corridor providing a foot rest for a user exercising a pulling action on a resistance strap mounted onto the vertically oriented tower, whereby the horizontally oriented corridor with the user standing thereupon counteracts a moment of inertia acting onto the vertically oriented tower as a result of the exercising of a pulling action on the resistance strap mounted thereupon, and a housing provided at a bottom end of the telescopically deployed vertically oriented tower and comprising a lower compartment and an upper compartment, a separating wall being provided in between the lower compartment and the upper compartment, wherein the lower compartment is adapted to provide a controlled deployment of the horizontally oriented corridor and to provide storage of said plurality of profile members thereof and the upper compartment is adapted to fixedly support the telescopically deployed vertically oriented tower during use of the device and to provide storage of the plurality of sequentially connected pillars thereof and of a plurality of resistance straps used in various exercises conducted by users of the storable exerciser device.

BRIEF DESCRIPTION OF THE DRAWINGS

The invention will be best understood by those skilled in the art by reference to the accompanying drawings in which:

FIG. 2a shows in perspective the exerciser device of FIG. 1 with the vertically oriented tower partially retracted, but yet projected upwardly to provide exercising practice that necessitates a reduced height of the tower.

FIG. 2b shows in perspective the exerciser device of FIG. 1 with the horizontally oriented corridor retracted and stored within a lower compartment of a housing of the device and with the vertically oriented tower fully retracted, but yet projected upwardly the upper compartment of the housing of the exerciser device.

FIG. 2c shows in perspective the exerciser device in a fully stored condition with the profile members of the horizontally oriented corridor retracted and stored within the lower compartment of the housing of the device and with the assembly of pillars of the vertically oriented tower conveniently stored within the upper compartment of the housing of the device.

FIG. 7 shows a detailed planar view of the series of flanges being mounted onto the top of sequentially connected pillars employed in building up the vertically oriented tower of the invention.

FIG. 8 shows a planar view of the flanges sequentially connected onto the top of the pillars of the vertically oriented tower of the invention, wherein each pillar is adapted to enter within the immediately adjacent lower pillar and to receive the immediately adjacent upper pillar.

FIGS. 9a-9c show in perspective three sequential phases in the operation of engagement of a top pillar with an underlying pillar of the sequentially assembled pillars of the vertically oriented tower of the exerciser device of the invention.

FIG. 10a shows in perspective a bracket housing a reciprocally movable pin that is provided at a lateral side of each one of the flanges of FIG. 7, such bracket and pin assembly being adapted to alternatively lock sequential pillars in a deployed mode of the tower of the invention or unlock sequential pillars to provide a retracted assembly thereof.

FIG. 10b shows in perspective the pin of the bracket and pin assembly of FIG. 10a.

FIG. 10c shows in perspective the pin of the bracket and pin assembly of FIG. 10a with the spring wound around the circumference thereof in an idle condition that pertains to a locked condition of the sequentially assembled pillars of the vertically oriented tower of the exerciser device of the invention.

FIG. 10d shows in perspective the pin of the bracket and pin assembly of FIG. 10a with the spring wound around the circumference thereof in a compressed condition that pertains to an unlocked condition of the sequentially assembled pillars of the vertically oriented tower of the exerciser device of the invention.

FIG. 12 shows a perspective view from underneath of one of the profile members that are sequentially connected to form the horizontally extending corridor whereupon stands a user during exercising with the exerciser device of the invention.

FIGS. 12a and 12b respectively show a cross sectional view of a bracket and pin assembly being adapted in a mode of locking sequential profile members in a deployed mode of the horizontally extending corridor of the invention and in a mode of unlocking sequential profile members to provide a retracted assembly thereof.

FIGS. 15a and 15b show in perspective two successive stages in an exercise performed by a user employing a single exerciser devices of the invention and standing onto the horizontally extending corridor thereof whilst exerting a pulling action onto a resistance strap appropriately suspended onto the vertically extending tower.

DETAILED DESCRIPTION OF PREFERRED EMBODIMENTS

The invention will be hereinafter described by reference to the illustrative embodiments presented in the accompanying drawings.

Figure 1:
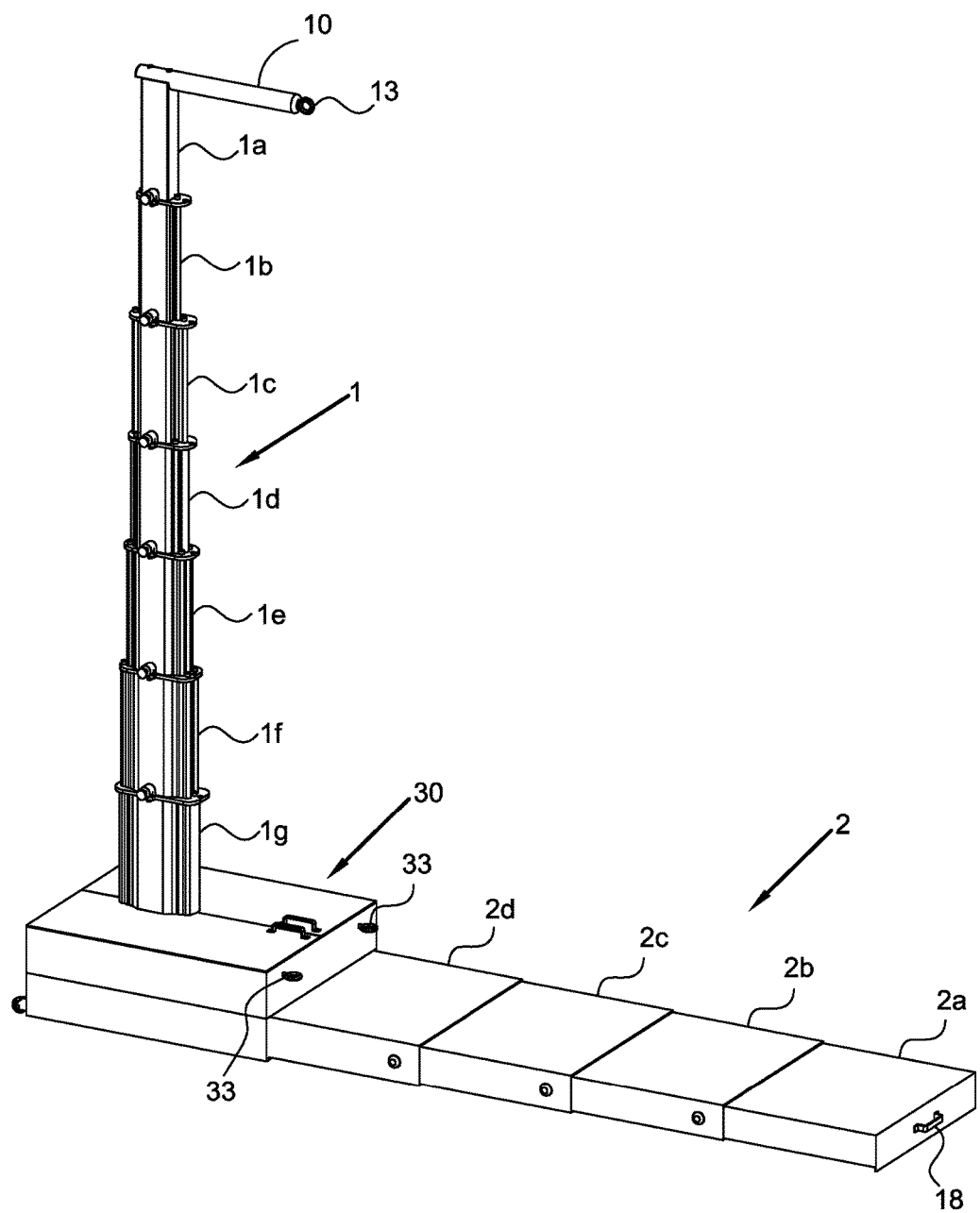
FIG. 1 shows in perspective the exerciser device of the invention that consists of a vertically oriented tower comprising a plurality of telescopically deployed assembly of pillars and a horizontally oriented corridor comprising a plurality of telescopically deployed profile members, wherein both the vertically oriented tower and the horizontally oriented corridor are shown in a fully deployed condition.

As shown in the perspective view of FIG. 1, the exerciser device of the invention comprises a telescopically deployed vertically oriented tower 1, a telescopically deployed horizontally oriented corridor 2 and a housing 30 provided at a bottom end of the telescopically deployed vertically oriented tower 1, wherein the housing 30 is adapted to provide a neatly configured storage medium of the exerciser device, whilst further providing a support base for the deployment of the vertically oriented tower 1 and a means for a controlled deployment of the horizontally oriented corridor 2.

Whilst FIG. 1 shows the exerciser device of the invention with both the vertically oriented tower 1 and the horizontally oriented corridor 2 in a fully deployed condition, FIG. 2a shows the exerciser device with the vertically oriented tower 1 partially deployed and partially contracted and with the horizontally oriented corridor 2 still fully deployed, whereas FIG. 2b shows both tower 1 and corridor 2 fully retracted within the housing 30.

Figure 4:
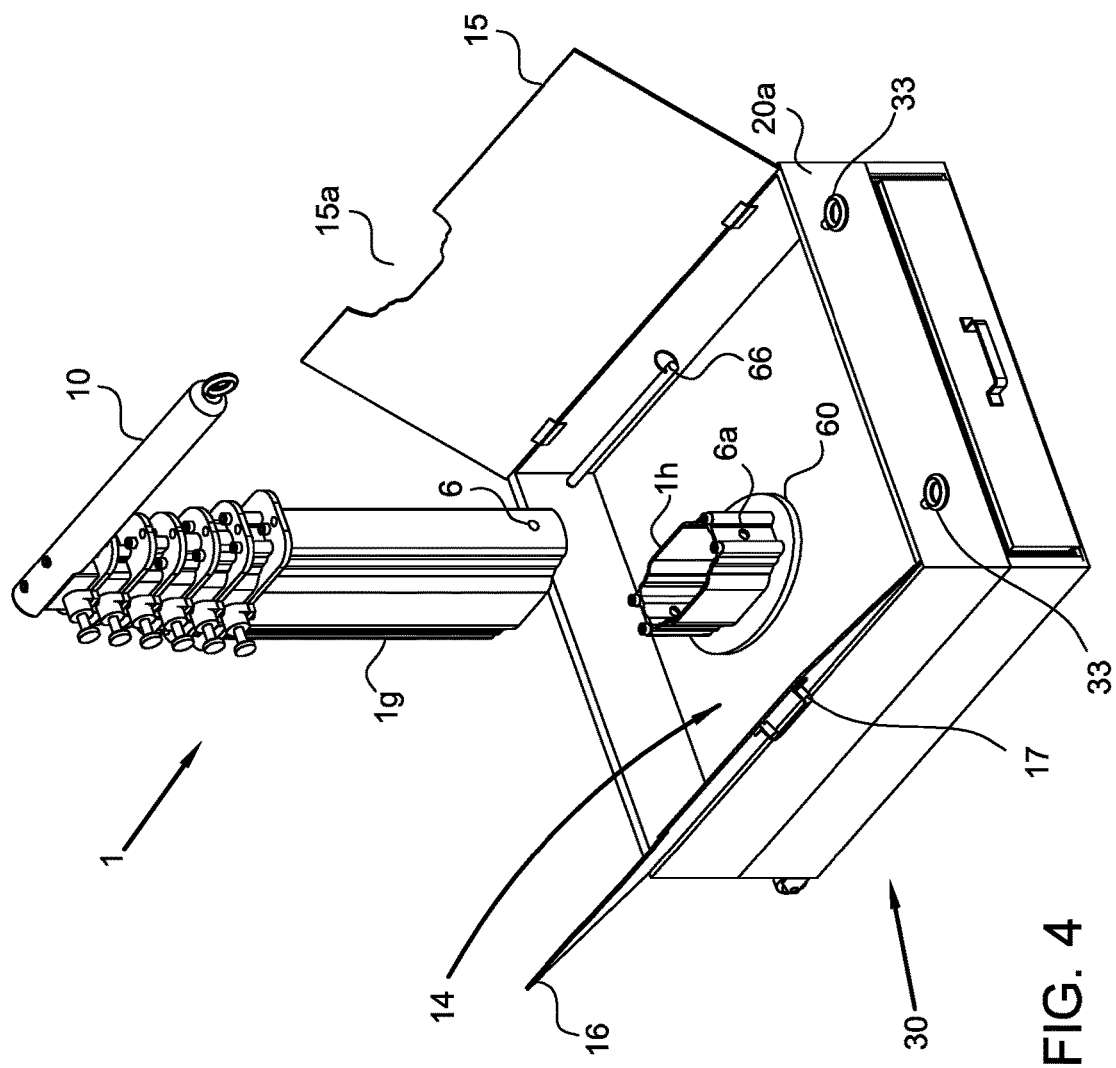
FIG. 4 shows in perspective a frontal view of the housing of the device wherein the retracted assembly of pillars of the vertically oriented tower has been lifted at an upright condition overlying the upper compartment of the housing and the bottom pillar thereof is being brought in a position of engagement with the founding pillar fixedly mounted within the upper compartment of the housing.

The abovementioned telescopically deployed vertically oriented tower 1 is composed by a plurality of sequentially connected pillars including a top pillar 1a, a bottom pillar 1g and an array of intermediate pillars therebetween as referenced by numerals 1b, 1c, 1d, 1e, 1f in an order from top to bottom. The telescopically deployed vertically oriented tower 1 is provided with a plurality of points of suspension of a resistance strap 20 wherein a user may detachably connect one end of such a resistance strap 20 in order to perform desired exercises. It is noted that each one of the sequentially connected pillars 1a-1g of the aforementioned vertically oriented tower 1 has a similarly configured section, wherein this section gradually diminishes from the bottom to the top of the tower 1 so that each pillar may be nested within the immediately adjacent underlying pillar and provide nesting of the immediately adjacent overlying pillar when tower 1 is brought in a retracted condition, thereby being prepared for storage within the housing 30 as illustratively shown in FIG. 4. The top pillar 1a may thus be nested within the underlying pillar 1b when tower 1 is retracted and sequentially pillar 1b may be nested within pillar 1c, 1c within 1d, 1d within 1e, 1e within 1f and 1f within the bottom pillar 1g. Eventually the array of sequentially retracted pillars 1a-1g as shown in FIG. 4 is ready for storage within the housing 30 as will be disclosed hereinafter.

Figure 6:
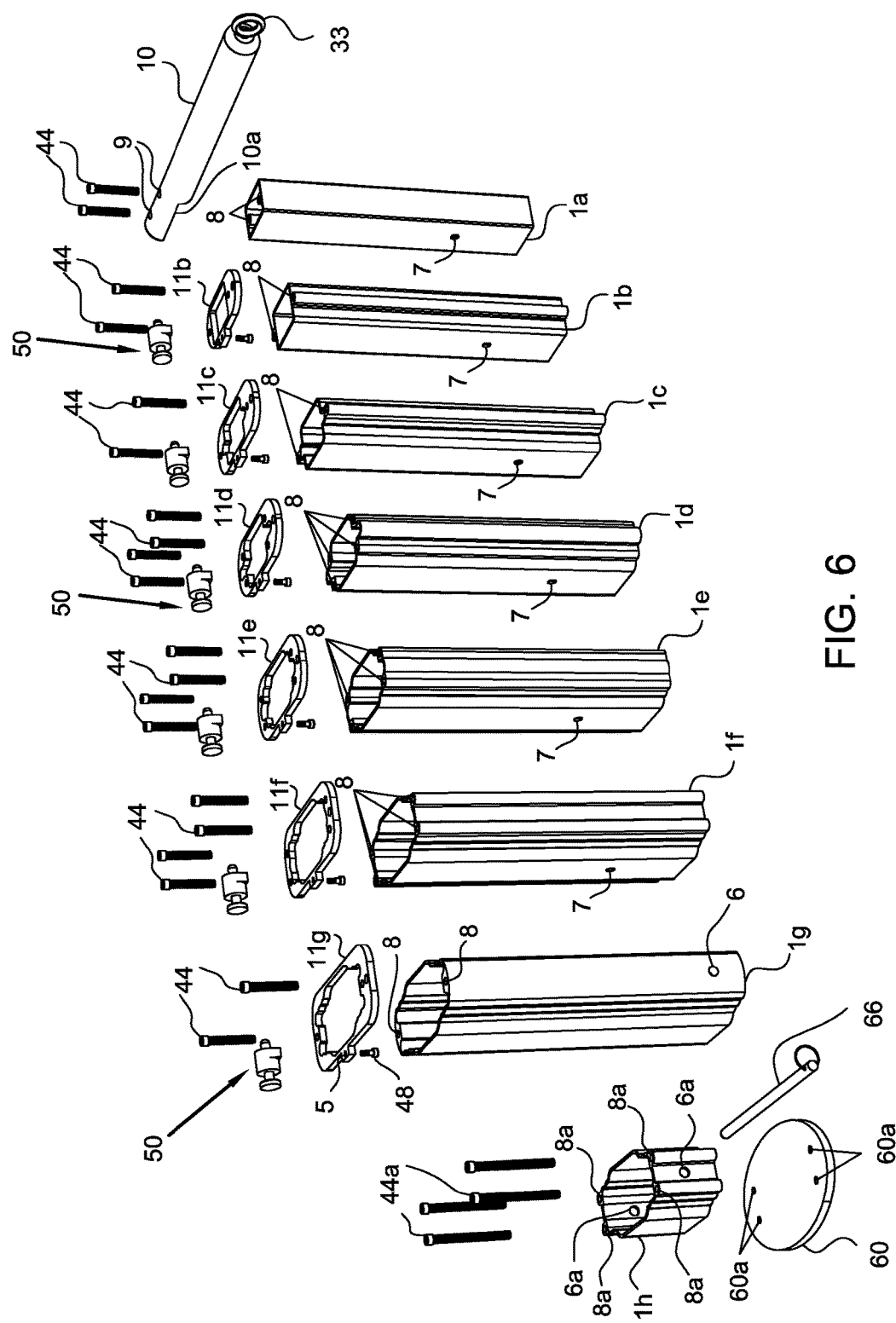
FIG. 6 shows in perspective a series of the sequentially connected pillars and of flanges shown overlying consecutive pillars as these are employed in accordance with a preferred embodiment of the invention in the assembly of the vertically oriented tower of the invention.

As shown in FIG. 6, each one of the intermediate pillars 1b-1f, as well as the bottom pillar 1g of the aforementioned vertically oriented tower 1 is provided with a flange fixedly mounted on a top end thereof. A series of flanges 11b, 11c, 11d, 11e, 11f and 11g numbered so as to correspond to the aforementioned series of intermediate pillars 1b, 1c, 1d, 1e, 1f and the bottom pillar 1g is analytically depicted in FIG. 7.

Each flange of the series of flanges 11b-11g is provided with at least a pair of opposing holes 4 adapted to coaxially align with a correspondingly arranged at least one pair of holes 8 anti-diametrically arranged at the top end of each one of the series of intermediate pillars 1b-1f and at the top of the bottom pillar 1g. No flange is provided for the top pillar 1a, yet this pillar is provided with a pair of holes 8 anti-diametrically arranged at the top end thereof adapted to receive a horizontally extending bar as will be described herein after. It is in this respect noted that, as shown in FIG. 6, each one of the intermediate pillars 1b, 1c and the bottom pillar 1g is provided with a pair of holes 8 and, as shown in FIG. 7, each one of the respective flanges 11b, 11c and 11g adapted to be mounted thereupon is provided with a pair of holes 4 coaxially aligned with holes 8 so as to allow passage of two bolts 44 and provide fixedly mounting of flanges 11b, 11c and 11g correspondingly on top of the pillars 1b, 1c and 1g. It is accordingly noted that, as shown in FIG. 6, each one of the pillars 1d, 1e and 1f is provided with two pairs of anti-diametrically arranged holes 8 and, as shown in FIG. 7, each one of the respective flanges 11d, 11e and 11f adapted to be mounted thereupon is correspondingly provided with two pairs of holes 4 coaxially aligned with holes 8 so as to allow passage of four bolts 44 and provide fixedly mounting of flanges 11d, 11e and 11f correspondingly on top of the pillars 1d, 1e and 1f. It is conclusively outlined that, where allowed by spatial considerations, a pillar and the flange associated therewith will preferably comprise two pairs of appropriately spaced holes 8 and 4 respectively to afford a yet stronger connection.

As recited hereinabove the telescopically deployed vertically oriented tower 1 comprises sequentially arranged pillars with a top pillar 1a, intermediate pillars 1b-1f and a bottom pillar 1g, wherein each pillar is adapted to enter within the immediately adjacent underlying pillar and to receive the immediately adjacent overlying pillar. As mentioned hereinabove each of the pillars 1a-1g has a similarly configured section that gradually diminishes from the bottom to the top of the tower 1 so that each pillar may be nested within the immediately adjacent underlying pillar when tower 1 is brought in a retracted condition. Accordingly, as shown in FIG. 7, the flanges mounted onto the top of the pillars also have a similarly configured section that gradually diminishes from a maximally sized lowermost flange 11g mounted on top of pillar 1g to a minimally sized uppermost flange 11b mounted on top of pillar 1b. This gradual difference in the size of the flanges is also apparent from the planar view of the entire assembly of flanges in FIG. 8.

In accordance with a preferred embodiment depicted in the drawings the section of the sequentially arranged pillars is generally rectangular in as far as the upper pillars provided with a single pair of holes 8 is concerned, whilst the section of the pillars gradually evolves into an octagonal section in the underlying pillars thereafter. As shown in FIG. 7, the section of the flanges mounted thereupon is generally rectangular with rounded edges, but the openings 1a'-1f' thereof accurately follow the shape of the section of the overlying pillars to be nested therein when tower 1 is brought in a retracted condition.

In accordance with a preferred embodiment of the invention, the exerciser device further comprises a horizontally extending bar 10 that is fixedly mounted at a top end of the top pillar 1a of tower 1, As shown in FIG. 6 bar 10 is generally cylindrical with a semi-cylindrical end 10a provided with a pair of through holes 9. When the semi-cylindrical end 10a is mounted onto the top of top pillar 1a, the through holes 9 are axially coincident with the anti-diametrically located holes 8 at the top of pillar 1a and a pair of bolts 44 is arranged to pass through the axially coincident holes 8, 9 to fixedly mount the horizontally extending bar 10 onto the top pillar 1a of the vertically oriented tower 1. An eyebolt 13 is appropriately mounted at the free end of the horizontally extending bar 10, this eyebolt 13 being adapted to provide a point of suspension of a resistance strap 20.

Each one of the flanges 11b-11g is provided with a central opening adapted to receive the immediately overlying pillar, whilst the rim thereof circumferentially extends marginally beyond the perimeter of the pillar onto which it is being mounted. In particular, as shown in FIG. 7, flange 11b that is connected onto the top of pillar 1b has a central opening 1a' adapted to receive the top pillar 1a, flange 11c that is connected onto the top of pillar 1c has a central opening 1b' adapted to receive pillar 1b, flange 11d that is connected onto the top of pillar 1d has a central opening 1c' adapted to receive pillar 1c, flange 11e that is connected onto the top of pillar 1e has a central opening 1d' adapted to receive pillar 1d, flange 11f that is connected onto the top of pillar 1f has a central opening 1e' adapted to receive pillar 1e and flange 11g that is connected onto the top of the bottom pillar 1g has a central opening 1f' adapted to receive pillar 1f.

Furthermore each flange is provided with at least one through hole 3 at one side of the rim thereof adapted to provide the means of appropriately suspending a resistance strap 20 and with a hole 5 provided at the middle of an extension 5a at another side of the rim of the flange, such extension 5a adapted to provide a support for a bracket adapted to house a pin that moves axially therein, this pin being used to detachably connect a pair of adjacent pillars of the plurality of sequentially connected pillars as will be described hereinafter.

As seen in FIG. 6, one selected side of the top pillar 1a and of each one of the intermediate pillars 1b-1f is provided with a through hole 7 proximally at the bottom thereof, wherein all these holes 7 lying along the vertical line passing through a line of movement of each one of the pins of the bracket and pin assemblies mounted onto the aforementioned extensions 5a of flanges 11b-11g, thereby being located at a position adapted to receive the abovementioned pins and provide connection of sequential pillars when the vertically extending tower 1 is deployed.

FIG. 10a shows in perspective a bracket and pin assembly 50 that is adapted to detachably connect a pair of adjacent pillars in the vertically oriented tower 1 of the exerciser device. The bracket and pin assembly 50 comprises a cylindrical bracket 51 and a pin 52 passing axially through this cylindrical bracket 51. The bracket 51 comprises a planar extension 55a with a medially located hole 55, wherein this planar extension 55a is arranged to be mounted onto the planar extension 5a at the rim of each flange of the plurality of flanges 11b-11g, whereby the medially located hole 55 of planar extension 55a of the bracket 50 axially coincides with the medially located hole 5 of the planar extension 5a of the flange and, as shown in FIG. 6, a screw 48 is arranged to pass through these axially coincident holes 5-55 and fixedly mount the bracket 51 onto the planar extension 5a at the rim of each flange of the plurality of flanges 11b-11g.

FIG. 10b shows the pin 52 of the bracket and pin assembly 50 of FIG. 10a, wherein pin 52 is provided with a rear end comprising a head 53 and a frontal end comprising a rounded end 54. An annular ring 57 is provided at a predetermined location around the circumference of pin 52, such annular ring 57 being contained within the bracket 51. FIG. 10c shows half of the section of bracket 51, whereby one can see the pin 52 passing axially through the bracket 51 and a spring 56 being wound around the pin 52, such spring 56 being restrained in between a wall of bracket 51 and the aforementioned annular ring 57 of pin 52. An idle condition of the bracket and pin assembly 50 corresponds to a relaxed condition of spring 56 seen in FIG. 10c, such condition pertaining to a locked condition of the sequentially assembled pillars of the vertically oriented tower of the exerciser device of the invention, whereas an active condition of the bracket and pin assembly 50 corresponds to a compressed condition of spring 56 seen in FIG. 10d, such condition pertaining to an unlocked condition of the sequentially assembled pillars of the vertically oriented tower of the exerciser device of the invention.

The bracket and pin assembly 50 of the invention is arranged to act so as to provide connection and disconnection of adjacent pillars in the vertically oriented tower 1 of the exerciser device. By way of example, FIGS. 9a-9c show in perspective three sequential phases in the operation of engagement of the top pillar 1a with the underlying pillar 1b of the sequentially assembled pillars of the vertically oriented tower 1. In particular, FIG. 9a shows the top pillar 1a approaching the underlying pillar 1b with a scope of being inserted therein. It is noted that at this stage the bracket and pin assembly 50 mounted onto the flange 11b at the top of pillar 1b is at an idle condition with the pin 52 extending within the opening of the flange 11b that is arranged to receive the overlying pillar 1a. FIG. 9b shows the top pillar 1a having come in contact with the underlying pillar 1b, whereby the head 53 of pin 52 has to be pulled outwardly in order to clear the space within the opening of the flange 11b to allow unhindered insertion of pillar 1a therein. As the frontal rounded end 54 of pin 52 slides in abutment with the surface of pillar 1a as the latter is being inserted, pin 52 is automatically entrapped within the side hole 7 of pillar 1a that lies along the vertical passing through the rounded end 54 of pin 52. As a result the bracket and pin assembly 50 is being restored at an idle condition with the head 54 being released and pin 52 protruding through the side hole 7 of pillar 1a to provide connection thereof with the underlying pillar 1b as the tower 1 of the exerciser device is brought at a deployed condition. When tower 1 has to be retracted, disconnection of the depicted pillars 1a and 1b can be effected by pulling outwardly the head 53 of pin 52 in order to clear the space within the opening of the flange 11b and allow either the unhindered extraction of pillar 1a therefrom or the unhindered sliding of the frontal rounded end 54 of pin 52 in abutment with the surface of pillar 1a as the latter is being inserted further within the underlying pillar 1b when tower 1 is being brought at a retracted condition. Connection or disconnection of other adjacent pillars of the assembly of sequentially connected pillars of tower 1 of the exerciser device of the invention is accordingly implemented in the manner described hereinabove.

The bottom pillar 1g of tower 1 of the exerciser device differs from the array of the sequentially connected overlying pillars 1a-1f in that it is not provided with the through hole 7 provided at a side of these pillars to serve the purpose of detachably connecting one with the other. The bottom pillar 1g does not have to be connected to an underlying pillar of tower 1 and instead it has to be detachably, yet fixedly, mounted onto a support structure provided within the housing 30.

Figure 3:
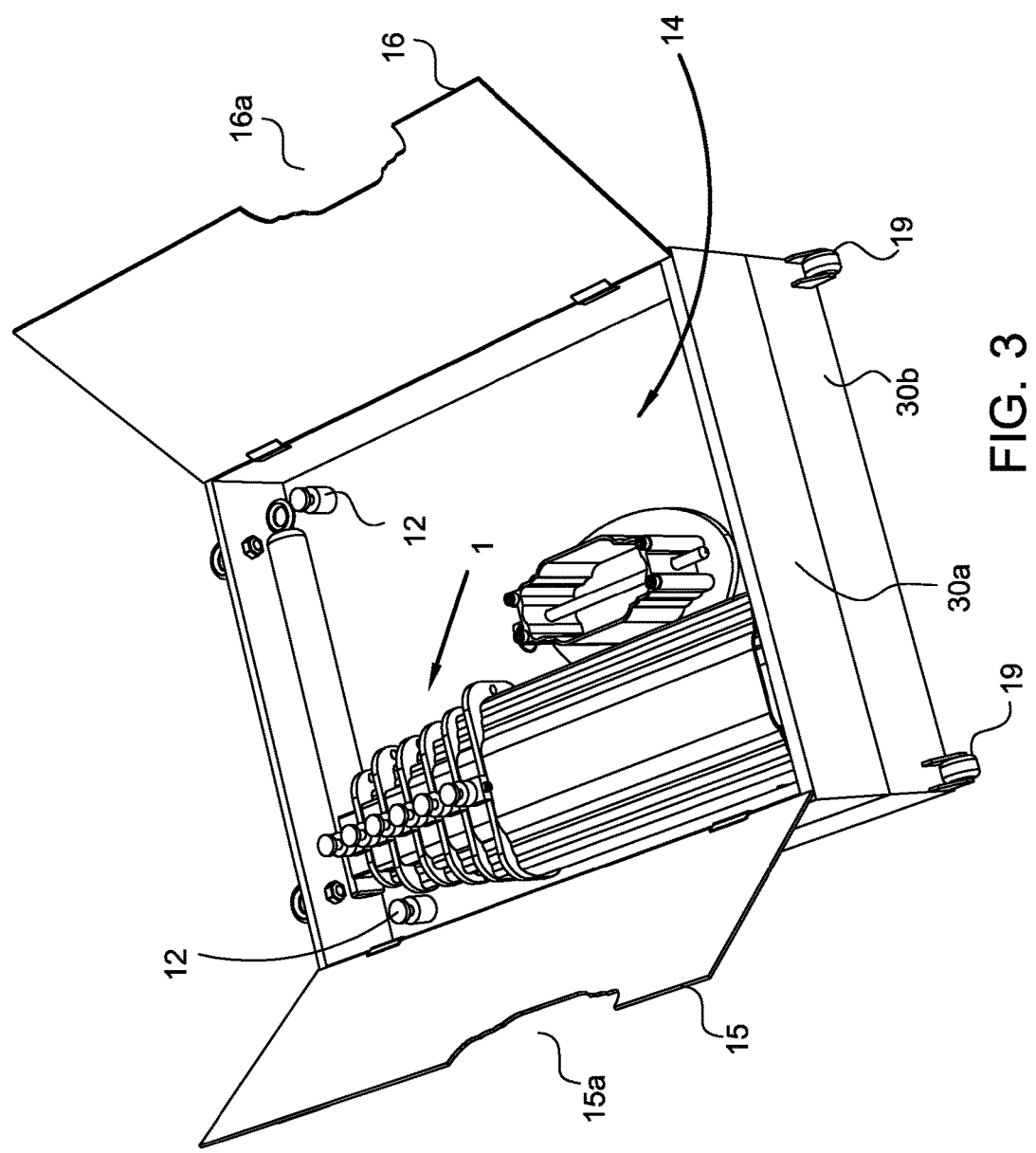
FIG. 3 shows in perspective a rear view of the housing of the device with a founding pillar fixedly mounted within the upper compartment thereof and the retracted assembly of the vertically oriented tower conveniently stored within a space provided at one side of the founding pillar.

As seen in FIGS. 3 and 4 that respectively depict a rear and a frontal view of the housing 30 of the exerciser device of the invention, the housing 30 comprises an upper compartment 30a and a lower compartment 30b with a separating wall 14 being provided to separate the upper compartment 30a from the lower compartment 30b, thereby wall 14 providing a floor for the upper compartment 30a and a ceiling for the lower compartment 30b.

Figure 5:
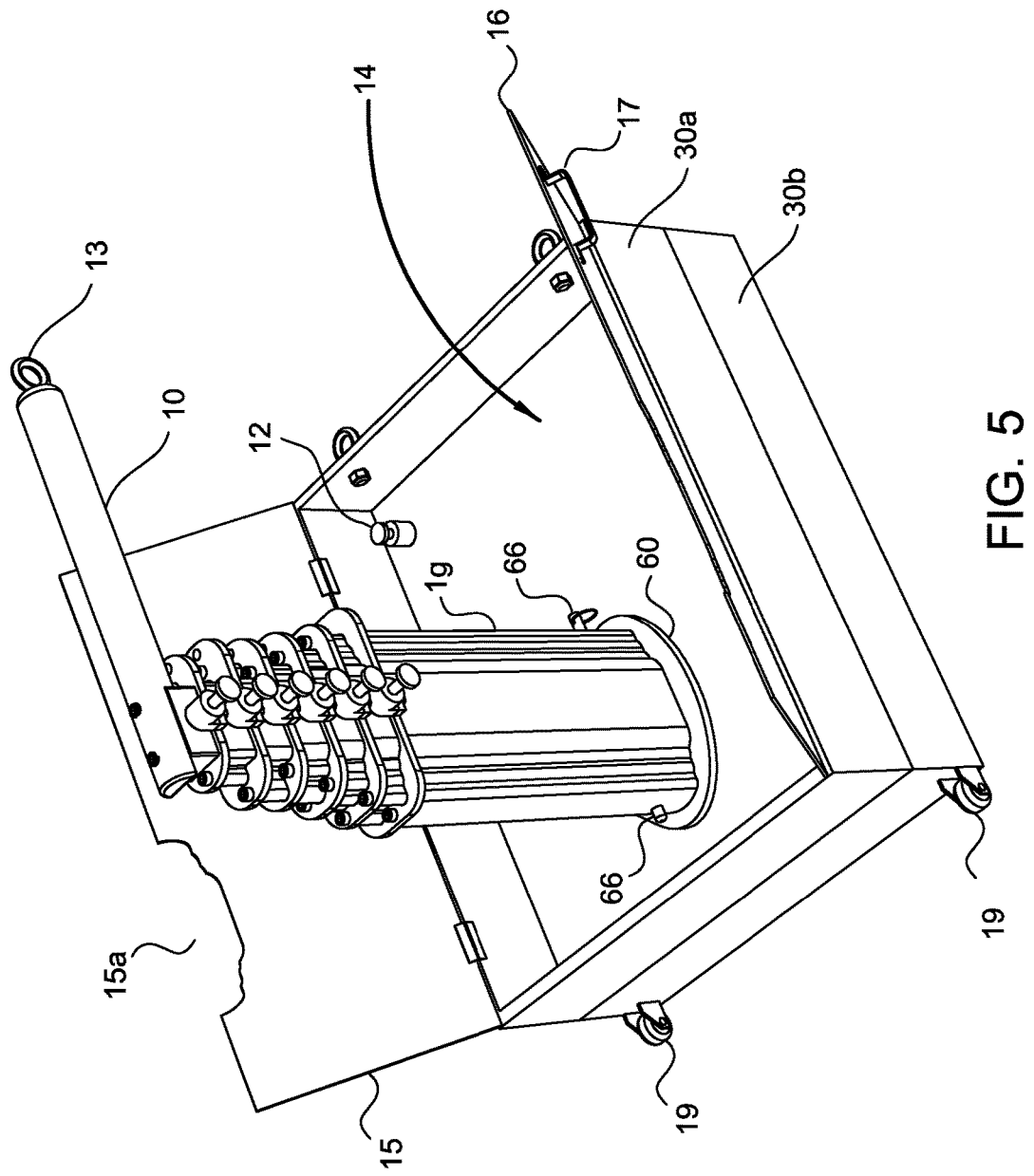
FIG. 5 shows in perspective a side view of the housing of the device wherein the bottom pillar of the retracted assembly of pillars of the vertically oriented tower has been securely engaged with the founding pillar fixedly mounted within the upper compartment of the housing.

A post adapted to fixedly support the telescopically deployed vertically oriented tower 1 is provided onto the wall 14 within the upper compartment 30a, this post comprising a plate 60 that is welded onto the wall 14 and a founding pillar 1h fixedly mounted onto plate 60 by means of four long screws 44a that pass through an arrangement of through holes 8a at four corners of the founding pillar 1h and are driven into holes 60a of plate 60 (FIG. 6) thereby fixedly mounting the founding pillar 1h onto plate 60. The founding pillar 1h is provided with a pair of anti-diametrically oriented through holes 6a at two opposing sides thereof, whilst the bottom pillar 1g of tower 1 of the exerciser device is also provided with a pair of anti-diametrically oriented through holes 6 at two opposing sides proximally at the bottom thereof as seen in FIG. 6. The retracted assembly of pillars as seen in FIG. 4 is mounted onto the aforementioned post provided onto the wall 14 of compartment 30a of the housing 30 with the bottom pillar 1g exteriorly abutting the founding pillar 1h (FIG. 5) whereby an elongate shaft 66, that is shown in FIGS. 4, 5 and 6, is passed through the coincident through holes 6 and 6a and maintains the assembly of pillars of the vertically deployed tower 1 fixedly supported onto the post provided on the floor 14 of the upper compartment 30a of housing 30. When tower 1 has to be retracted the bottom pillar 1g is disconnected from the founding pillar 1h through withdrawal of the elongate shaft 66 and then the retracted assembly of pillars may be stored within the upper compartment 30a of housing 30 adjacently to the post with the founding pillar 1h as shown in FIG. 3, the free space at the other side of the post being provided for the storage of resistance straps and other auxiliary equipment for the exercising process.

A pair of gates 15, 16 provided with manually operated handles 17 (FIG. 2b, 2c, 4) is pivotally connected at the sides of the upper compartment 30a and are employed to provide closure thereof. It is noted that a pair of equivalently configured recesses 15a, 16a (FIG. 3) are provided in the gates 15, 16 respectively, such recesses forming an appropriately sized opening 15a=16a when gates 15, 16 are closed (FIG. 2c) for allowing the assembly of pillars 1a-1g of tower 1 to protrude through this opening (FIG. 2b).

In accordance with a preferred embodiment of the invention, a pair of wheels 19 is provided at the rear of the housing 30, wherein these wheels 19 do not touch the ground, i.e. they are relatively elevated with respect to the bottom of the housing 30, but the housing 30 may be tilted to be based onto the wheels 19 when the exerciser device is stored therein ready for transport, e.g. as shown in FIG. 2c.

Figure 11:
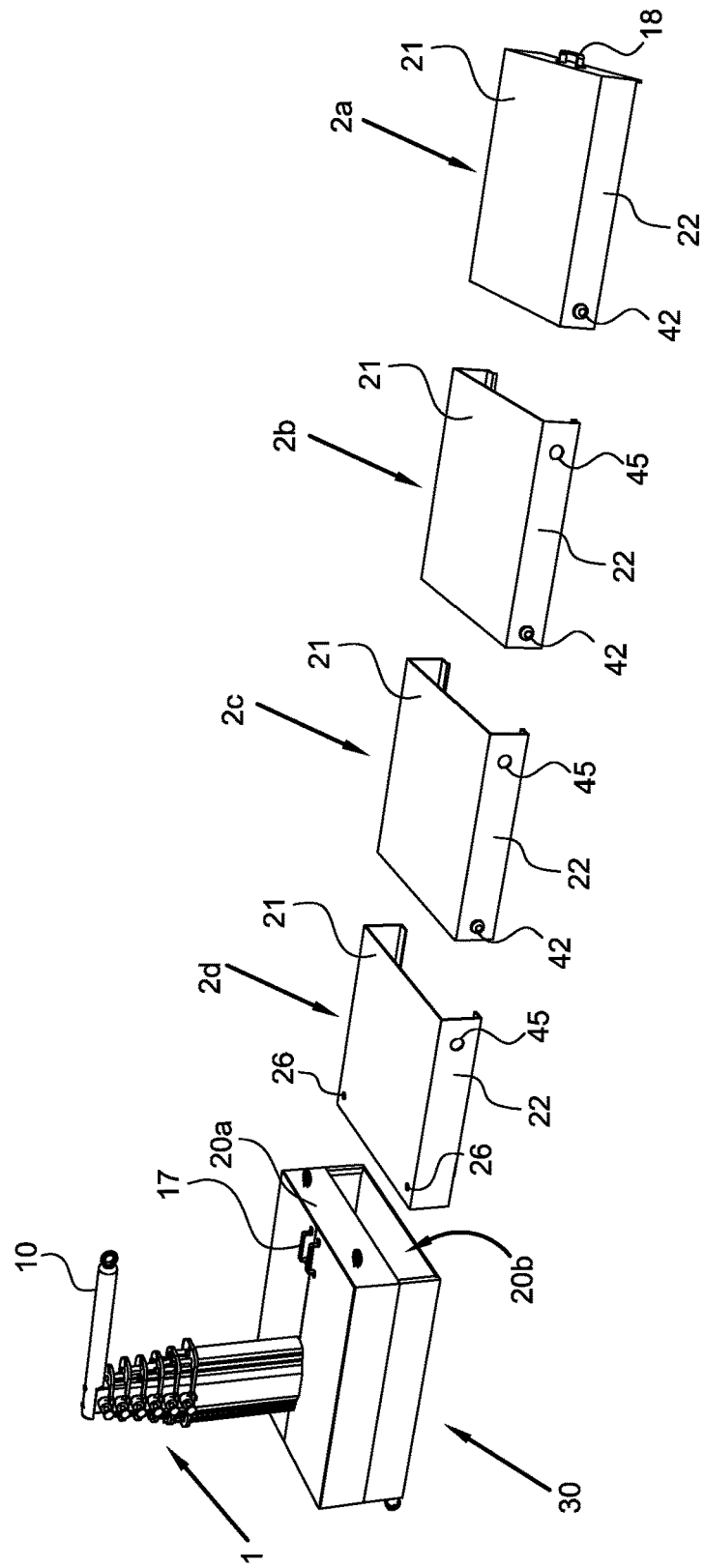
FIG. 11 shows in perspective the exerciser device with the vertically extending tower at a retracted condition and with an exploded view of a series of profile members that are sequentially connected to form the horizontally extending corridor whereupon stands a user during exercising with the exerciser device of the invention.

As shown in FIG. 11, the frontal side of the housing 30 is closed by a frontal lateral surface 20a of the upper compartment 30a, whilst the underlying frontal side of compartment 30b denoted by numeral 20b in FIG. 11 remains open and it is only covered by a lateral surface 34 of the outermost profile member of corridor 2 when the latter is brought at a retracted condition as shown in FIG. 2b or 2c.

Figure 16A:
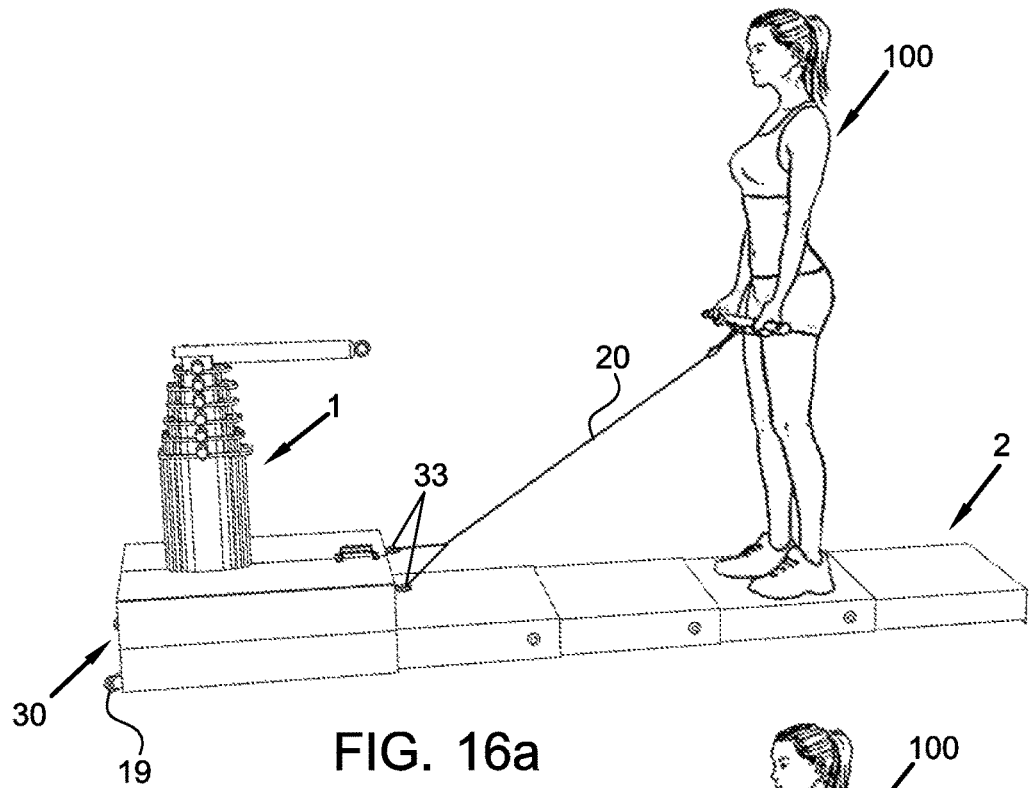
FIGS. 16a and 16b show in perspective two successive stages in an exercise performed by a user employing a single exerciser devices of the invention and standing onto the horizontally extending corridor thereof whilst exerting a pulling action onto a resistance strap appropriately suspended onto a pair of eyebolts provided onto the façade of the housing of the exerciser device.
Figure 16B:
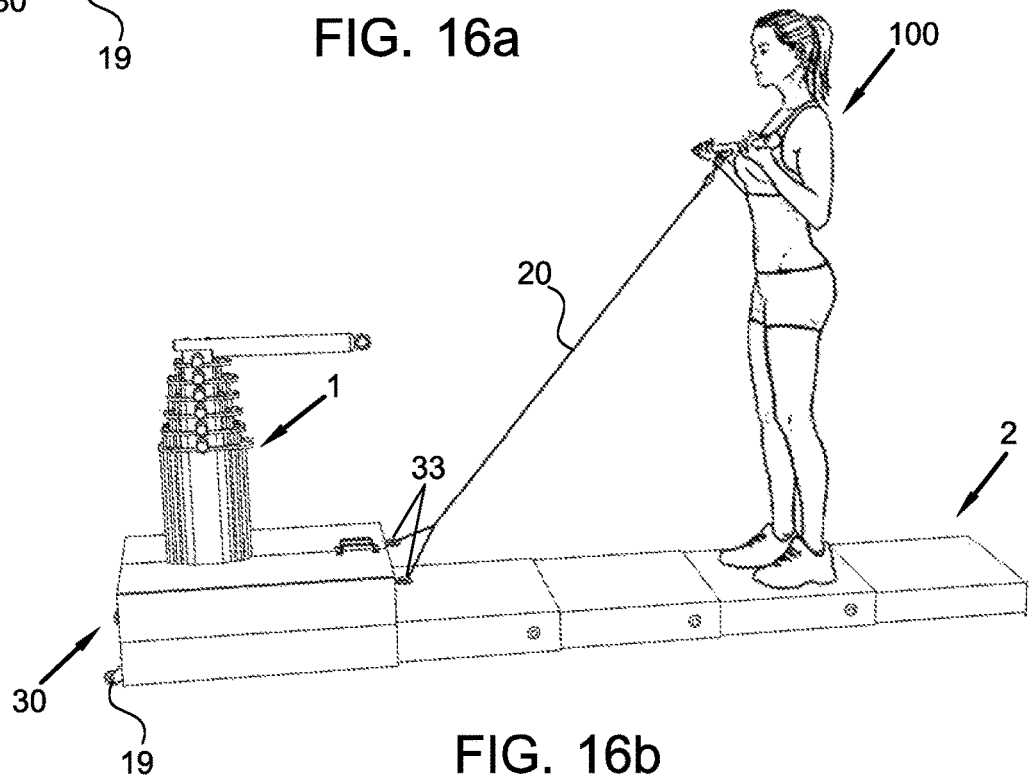

It is herein noted that in accordance with a preferred embodiment of the invention a pair of eyebolts 33 is appropriately mounted onto the frontal lateral surface 20a of the upper compartment 30a, this pair of eyebolts 33 being adapted to provide points of suspension of a resistance strap 20 for carrying out exercising, e.g. as illustratively shown in FIGS. 16a, 16b.

A telescopically deployed horizontally oriented corridor 2 is arranged to be stored within the lower compartment 30b of housing 30. When deployed, corridor 2 provides a foot rest for a user of the exerciser device, who exerts a pulling action on a resistance strap mounted onto tower 1, wherein corridor 2 with the user standing thereupon counteracts a moment of inertia acting onto tower 1 as a result of the exerting of the pulling action on the resistance strap suspended therein.

As illustratively shown in FIG. 11, the corridor 2 comprises a plurality of sequentially assembled profile members including an outermost profile member 2a, an innermost profile member 2d and intermediate profile members 2b and 2c therebetween.

As shown in FIG. 12, a typical profile member of the abovementioned plurality of sequentially assembled profile members has a uniform pi-section with an extended upper horizontal surface 21 that constitutes the surface providing the foot rest of the user of the exerciser device and a pair of short lateral legs of a first and a second vertically oriented surface 22 and 23, wherein a bottom end of each one of the first and second vertical surfaces 22 and 23 is being bent inwardly to form horizontally extending guides 24 and 25 respectively, wherein guides 24 and 25 respectively provide a guided sliding therein of the corresponding horizontally extending guides 24 and 25 of the lateral first and second vertical surfaces 22 and 23 of an immediately adjacent horizontally oriented and forwardly located profile member of the abovementioned plurality of sequentially assembled profile members. Thus, when corridor 2 is being brought at a retracted condition, the outermost profile member 2a is being inserted within profile member 2b, profile member 2b having incorporated profile member 2a is inserted within profile member 2c and profile member 2c having incorporated profile members 2a and 2b is inserted within the innermost profile member 2d. Naturally, the overall dimensions of profile members 2a-2d are marginally different and in particular having a marginally diminishing overall size from the innermost to the outermost profile member, thereby enabling insertion of one profile member within another with the innermost profile member 2d being adapted to contain the retracted assembly of profile members 2a-2b-2c.

With a scope of detachably connecting adjacent profile members that constitute corridor 2 of the exerciser device, a lateral side 22 of each of the profile members 2a-2c is provided with a bracket and pin assembly 40 comprising a bracket 41 and a locking pin 42 laterally displaceable under the action of a spring 46, wherein the spring 46 is wound around the pin 42 and contained within the bracket 41. The bracket and pin assembly 40 is mounted proximally to a rear end of each one of the profile members 2a-2c at the interior of the profile member and a through hole 45 is provided at a frontal end of the profile members 2b-2d, these holes 45 being adapted to receive the abovementioned locking pin 42, when corridor 2 is being deployed. In particular as shown in FIG. 11, the innermost profile member 2d comprises a lateral side 22 with a through hole 45, the outermost profile member 2a comprises a lateral side 22 with a bracket and pin assembly 40 and each one of the intermediate profile members, in this example profile members 2b and 2c, is provided with both a bracket and pin assembly 40 at the rear and a through hole 45 at a frontal end thereof.

FIGS. 12a and 12b respectively show a cross sectional view of a preferred embodiment of the bracket and pin assembly 40 that is being adapted to alternatively lock sequential profile members in the fully deployed mode of the horizontally extending corridor 2 of the invention and unlock sequential profile members to provide a retracted assembly thereof. As seen in the half of the section of bracket 41, pin 42 passes axially through the bracket 41 and a spring 46 is being wound around the circumference thereof, wherein spring 46 is being restrained in between a wall of bracket 41 and a rounded end of pin 42. An idle condition of the bracket and pin assembly 40 corresponds to a relaxed condition of spring 46 as seen in FIG. 12a, such condition pertaining to a locked condition of a pair of the sequentially assembled profile members of the horizontally oriented corridor 2 of the exerciser device of the invention, whereas an active condition of the bracket and pin assembly 40 corresponds to a compressed condition of spring 46 as seen in FIG. 12b, such condition pertaining to an unlocked condition of the pair of sequentially assembled profile members of the horizontally oriented corridor 2 of the exerciser device of the invention.

It is herein noted that when being deployed, corridor 2 is restrained from being extracted from the lower compartment 30b of the housing 30. In order to accomplish such restraining requirement a pair of pins 12 is provided onto a rear side of the separating wall 14 that divides housing 30 into the upper compartment 30a and the lower compartment 30b, such pins 12 protruding within the lower compartment 30b and being inserted within a pair of holes 26 (FIG. 11) at the rear of the innermost profile member 2d, wherein these holes 26 are spaced at a distance corresponding to the distance in which pins 12 are spaced, thereby effecting a restrain imposed on the innermost profile member 2d that is blocked from being extracted out of the lower compartment 30b of housing 30.

Deployment of a retracted assembly of the profile members that constitute corridor 2 is initiated by pulling outwardly a handle 18 provided at a frontal side of the outermost profile member 2a, whereby as the sequentially connected profile members are pulled outwardly from the lower compartment 30b of housing 30, the pins 42 extend forwardly through the brackets 41 under the action of the springs 46 and come in sliding contact with the first lateral vertical surface 22 of the immediately adjacent profile member until being inserted into the lateral through hole 45 thereof, whereas retraction of the corridor is initiated when these pins are consecutively manually pushed inwardly the lateral through holes 45 thereby releasing connection and allowing insertion of the sequentially assembled profile members within the lower compartment 30b of housing 30.

Figure 14A:
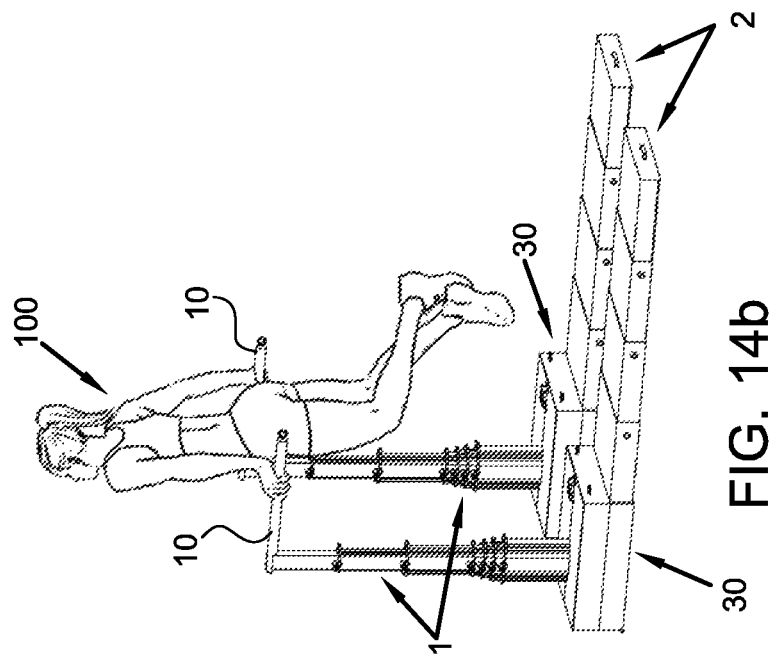
FIGS. 14a and 14b show in perspective two successive stages in an exercise performed by a user employing a pair of exerciser devices of the invention and standing onto a pair of horizontally extending corridors aligned in parallel whilst gripping and pushing downwardly the horizontally extending bars provided at the top of the vertically extending towers on either side thereof.
Figure 14B:
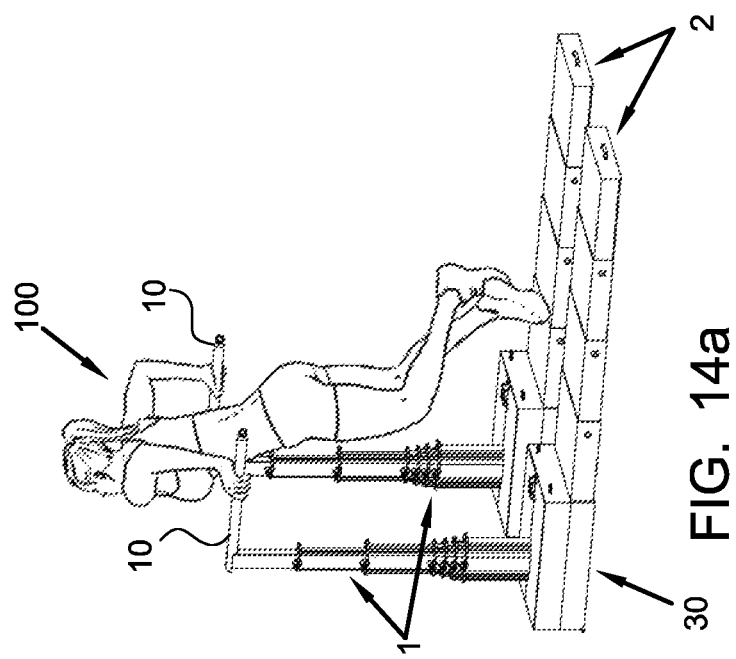

As described hereinabove, the aforementioned vertically oriented tower 1 comprises a plurality of points of suspension of a resistance strap 20, wherein a user 100 may detachably connect one end of such a resistance strap 20 in order to perform desired exercises. FIG. 2a shows in perspective the exerciser device of FIG. 1 with the vertically oriented tower 1 partially retracted, but yet projected upwardly to provide exercising practice that necessitates a reduced height of the tower as is the case with the exercising example depicted in FIG. 14a, 14b.

Figure 13A:
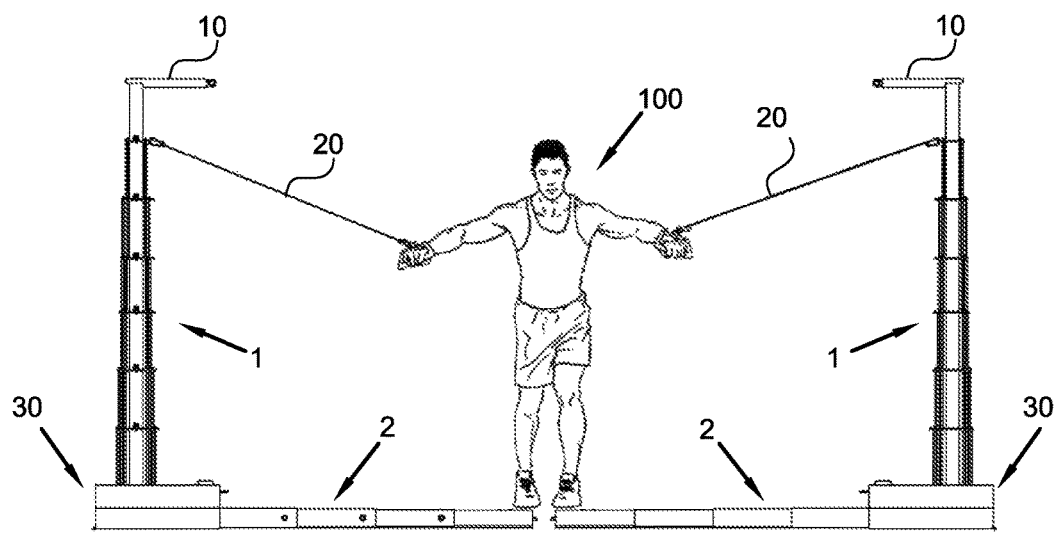
FIGS. 13a and 13b show in perspective two successive stages in an exercise performed by a user employing a pair of exerciser devices of the invention and standing onto a pair of horizontally extending linearly aligned corridors whilst exerting a pulling action onto a pair of resistance straps appropriately suspended onto the corresponding vertically extending towers of the exerciser device.
Figure 13B:
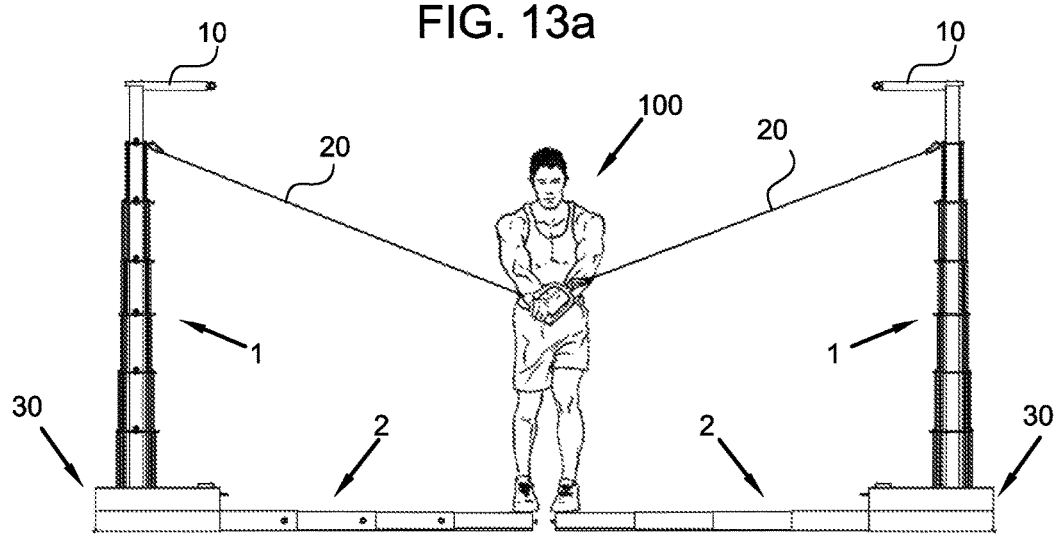

A single exerciser device can be used to perform various exercises as is the case with the exercising examples shown in FIGS. 15a-15b and 16a-16b and alternatively a pair of exerciser devises arranged in a relationship of facing one the other (FIG. 13a-13b) or in a parallel relationship (FIG. 14a-14b) to perform other kinds of exercises.

The invention claimed is:

1. A storable exerciser device comprising:
a telescopically deployed vertically oriented tower comprising a plurality of sequentially connected pillars including a bottom pillar, a top pillar and intermediate pillars therebetween, said sequentially connected pillars having sequentially diminishing sections from said bottom pillar to said top pillar, said bottom pillar and each one of said intermediate pillars being provided with a flange fixedly mounted on a top end thereof and being adapted to being inserted within an immediately adjacent underlying pillar and to receive an immediately adjacent overlying pillar, said flange being provided with at least one point of suspension of a resistance strap;
a telescopically deployed horizontally oriented corridor comprising a plurality of sequentially assembled profile members including an innermost profile member, an outermost profile member and intermediate profile members therebetween, said corridor being configured for providing a foot rest for a user standing thereon and exercising a pulling action on a resistance strap mounted onto said telescopically deployed vertically oriented tower, said corridor configured for providing a foot rest for the user standing thereupon counteracting a moment of inertia acting onto said tower as a result of the exercising of a pulling action on said resistance strap, and
a housing provided at a bottom end of said telescopically deployed vertically oriented tower and comprising a lower compartment and an upper compartment, a separating wall being provided in between said lower compartment and said upper compartment, said lower compartment being adapted to provide a controlled deployment of said horizontally oriented corridor and to provide storage of said plurality of profile members thereof and said upper compartment being adapted to fixedly support said telescopically deployed vertically oriented tower and to provide storage of said plurality of sequentially connected pillars thereof and of a plurality of resistance straps used in various exercises conducted by users of said storable exerciser device.

2. The storable exerciser device of claim 1, wherein each one of said flanges fixedly mounted on a top end of said bottom pillar and of each one of said intermediate pillars is provided with a rim circumferentially extending beyond a perimeter of said bottom pillar and of each one of said intermediate pillars, said rim comprising at least one first through hole, said at least one first through hole being adapted to provide said at least one point of suspension of a resistance strap and a planar extension with a centrally located second through hole, said planar extension being adapted to provide support for a first bracket and pin assembly adapted to detachably connect a pair of adjacent pillars of the plurality of sequentially connected pillars.

3. The storable exerciser device of claim 2, wherein said first bracket and pin assembly mounted onto each flange of a plurality of flanges of said bottom pillar and of said intermediate pillars comprises a pin adapted to move axially within a bracket under the action of a spring wound around said pin and contained within said bracket, said pin having a rear end and a frontal end, said frontal end of said pin protruding through said bracket under the action of said spring and abutting against a side of an overlying pillar that is adapted to being inserted through said flange, said frontal end of each said pin of said first bracket and pin assembly of each one of said plurality of flanges of said bottom pillar and of said intermediate pillars lying along a first vertical line in a direction of deployment of said telescopically deployed tower, said top pillar and each one of said intermediate pillars being provided with a lateral through hole proximally at a bottom end of one side thereof, said lateral through hole of said top pillar and of each one of said intermediate pillars being located along a second vertical line in the direction of deployment of said telescopically deployed tower, wherein said first vertical line being adapted to abut said second vertical line and said frontal ends of said pin of said first bracket and pin assembly of each one of said plurality of flanges of said bottom pillar and of said intermediate pillars being adapted to being inserted into said lateral through holes of said top pillar and of each one of said intermediate pillars during deployment of said telescopically deployed tower, whereas said frontal ends of said pin of said first bracket and pin assembly of each one of said plurality of flanges of said bottom pillar and of said intermediate pillars being adapted to be pulled outwardly said lateral through holes of said top pillar and of each one of said intermediate pillars to initiate retraction of said telescopically deployed tower in a retracted storage condition.

4. The storable exerciser device of claim 1, wherein said upper compartment of said housing comprises a post adapted to fixedly support said telescopically deployed vertically oriented tower, said post comprising a plate fixedly mounted onto said separating wall and a founding pillar fixedly mounted onto said plate, a first pair of anti-diametrically arranged lateral through holes being provided proximally at a bottom end of said founding pillar and wherein said bottom pillar of said plurality of sequentially connected pillars is provided with a second pair of anti-diametrically arranged lateral through holes proximally at a bottom end thereof, said bottom pillar of said plurality of sequentially connected pillars exteriorly abutting said founding pillar and said lateral through holes of said first pair of anti-diametrically arranged lateral through holes of said founding pillar being axially coincident with said lateral through holes of said second pair of anti-diametrically arranged lateral through holes of said bottom pillar, an elongate shaft being arranged to pass through said axially coincident through holes of said bottom pillar and said founding pillar providing connection thereof.

5. The storable exerciser device of claim 1, further comprising a horizontally extending bar fixedly mounted at a top end of said top pillar of said plurality of sequentially connected pillars.

6. The storable exerciser device according to claim 1, wherein each profile member of said plurality of sequentially assembled profile members has a uniform pi-section with an extended horizontal surface and a pair of short lateral first and second vertical surfaces, a bottom end of each one of said first and second vertical surfaces being bent inwardly to provide a guided sliding therein of the lateral first and second vertical surfaces of an immediately adjacent forwardly oriented profile member, the first lateral vertical surface of the innermost profile member and of each intermediate profile member being provided with a lateral through hole at a frontal end thereof and the first lateral vertical surface of the outermost profile member and of each intermediate profile member being provided with a bracket mounted interiorly at a rear end thereof, said bracket being adapted to house a reciprocally movable pin with a rounded end, said profile members of said plurality of sequentially assembled profile members having a gradually diminishing section from the innermost to the outermost profile member with a first intermediate profile member adapted to being inserted within the innermost profile member and the outermost profile member adapted to being inserted within a last intermediate profile member, wherein, as said sequentially connected profile members are pulled outwardly from said lower compartment of said housing during deployment of said telescopically deployed corridor, said reciprocally movable pins extend through said brackets thereof under the action of springs provided therein and abut against the first lateral vertical surface of the immediately adjacent profile member until being inserted into said lateral through hole thereof, whereas said pins are consecutively manually pushed inwardly said lateral through holes of said first lateral vertical surfaces to initiate insertion of said sequentially assembled profile members within said lower compartment of said housing during retraction of said telescopically deployed corridor in a retracted storage condition.

7. The storable exerciser device according to claim 6, wherein the extended horizontal surface of the innermost profile member comprises a pair of through holes proximally to a rear end thereof and said separating wall of said housing comprises a pair of vertically oriented pins, said vertically oriented pins protruding within said lower compartment of the housing and being adapted to being inserted within said through holes thereby retaining said innermost profile member within said lower compartment of said housing.

8. The storable exerciser device according to claim 6, wherein the outermost profile member comprises a frontal side surface, said frontal side surface comprising a handle for pulling said telescopically deployed horizontally oriented corridor outwardly from said lower compartment of said housing.

9. The storable exerciser device according to claim 6, wherein a frontal side surface of the upper compartment of said housing is provided with at least one eyebolt being adapted to receive a resistance strap.

\* \* \* \* \*